United States Patent [19]

Engel

[11] Patent Number: 4,619,801
[45] Date of Patent: Oct. 28, 1986

[54] METHOD FOR PRODUCING AN IMPROVED POLYMERIC HEAT EXCHANGE PANEL

[76] Inventor: Thomas P. Engel, Verfahrenstechnik, Haldenhof, 6287 Aesch/Lu, Switzerland

[21] Appl. No.: 614,773

[22] Filed: May 29, 1984

Related U.S. Application Data

[63] Continuation-in-part of Ser. No. 286,965, Jul. 27, 1981, abandoned.

[30] Foreign Application Priority Data

Jul. 29, 1980 [GB] United Kingdom ............... 8024821
Sep. 25, 1980 [GB] United Kingdom ............... 8030965
Oct. 23, 1980 [GB] United Kingdom ............... 8034194

[51] Int. Cl.$^4$ .............................................. B28B 11/06
[52] U.S. Cl. .................................... 264/146; 126/445; 165/56; 264/152; 264/248; 264/249; 264/320; 264/322
[58] Field of Search ............... 264/146, 152, 154, 322, 264/320, 319, 248, 249, 209.8; 165/49, 56; 126/442, 444, 446, 445

[56] References Cited

U.S. PATENT DOCUMENTS

2,748,401 6/1956 Winstead ........................ 264/209.8
4,261,947 4/1981 Ogi .................................... 264/263
4,312,687 1/1982 Sigworth ........................... 264/278
4,480,635 11/1984 Ostrovsky ........................ 126/445

FOREIGN PATENT DOCUMENTS

2742659 3/1979 Fed. Rep. of Germany .
2257879 8/1975 France .

Primary Examiner—Donald Czaja
Assistant Examiner—Mary Lynn Fertig
Attorney, Agent, or Firm—Stevens, Davis, Miller & Mosher

[57] ABSTRACT

A method is provided for producing a polymeric heat exchange panel of the type including a sheet with a multiplicity of longitudinally extending passages and a plurality of juxtaposed dividing walls respectively disposed between adjacent longitudinal passages, wherein each end of the passages is closed to define a manifold space and at least one of an inlet and an outlet communicates with at least one of the manifold spaces. The method includes forming at least one of the manifold spaces by severing longitudinally without substantial removal of dividing wall material said plurality of juxtaposed dividing walls toward and end of the sheet to form severed opposed sides thereof. The method further includes plasticizing the severed opposed sides of the sheet at an elevated temperature and molding the opposed sides together at end edges thereof to form a molded end wall having a longitudinal dimension substantially greater than a thickness of a wall of the sheet.

16 Claims, 14 Drawing Figures

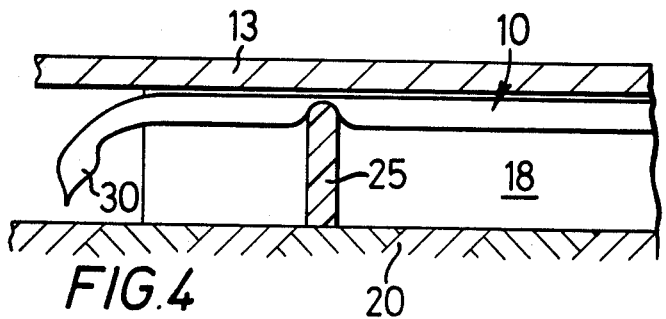
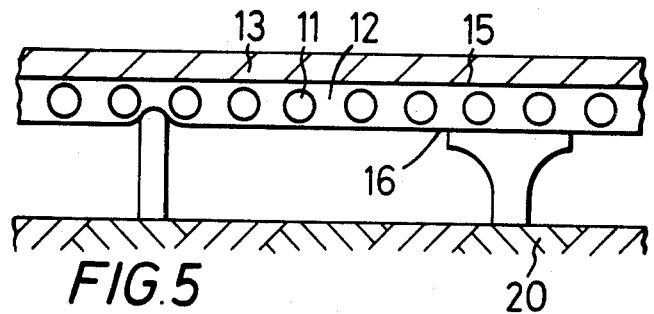
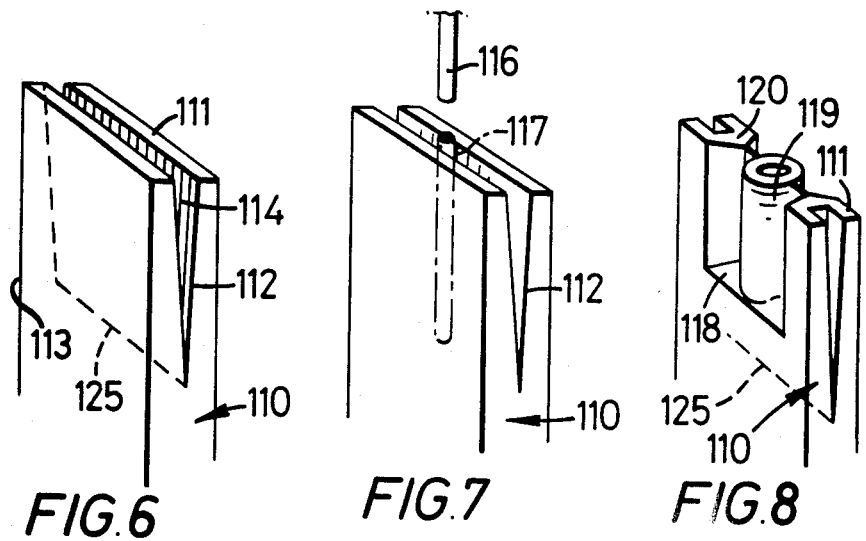

METHOD FOR PRODUCING AN IMPROVED POLYMERIC HEAT EXCHANGE PANEL

The present application is a continuation-in-part of Ser. No. 286,965, filed July 27, 1981, which has been abandoned.

DESCRIPTION

The present invention relates to heat exchangers and has particular reference to floor heating and cooling systems incorporating such heat exchangers.

Floor heating systems in general are well known and hitherto have been formed by laying a serpentine array of pipes necessary for the heat distribution and subsequently embedding the pipes in flooring materials such, for example, as a screed or concrete to form a planar surface. A heat exchange fluid, typically water, at an elevated temperature is passed through the serpentine array of pipes in order to heat the mass of screed constituting the flooring material and thereby heating the space within the room. Such arrangements work well, but suffer from the general disadvantage that a high temperature heat exchange fluid is required for effective operation of the system.

A disadvantage of teh serpentine arrangements is that a relatively small area of the floor is in fact covered by the heat exchange fluid. It is apparent, therefore, that if a low temperature heat source is to be employed, then clearly a much greater surface area of the total floor must be covered by heat exchange fluid at a lower temperature.

Furthermore, in view of the weight factor, such an arrangement cannot be installed readily in existing buildings. A further disadvantage is the slow heat response to temperature change in the heating fluid. This problem has generally been recognised in, for example, German Patent Specification No. 1074247, which provides for ceiling, wall or floor heating installations having ducts of rectangular or similar flat cross-section for carrying a heating fluid, preferably water, which extends substantially over the whole area to be heated on the outside of a rough surface wall or rough floor, and whose lateral surface parallel with the room is to be heated, characterised in that the structural members having the ducts take the form of tension proof hollow members which are resistant to compression and are made of tension proof, moisture impermeable plastics whose opposite flat side is used in known manner as a heating surface and has means for attaching the hollow member to a rough ceiling or a rough wall and the ducts of all the hollow members are interconnected in a known manner by welding or glueing the hollow members.

Solar heating panels particularly for heating swimming pools are also known from FR-A-No. 2257879. In this disclosure a solar radiation collector comprises a sheet having a multiplicity of passages therein in which each end is heat moulded to a divergent shape and closed by a separately formed manifold portion defining a manifold space with an inlet connected to a first manifold space and an outlet connected to a second manifold space remote therefrom; fluid flow being conducted in a substantially linear fashion therebetween.

FR-A-No. 2339830 discloses a heat exchanger comprising a plurality of planar panels 5 each inter-connected by transverse inlet-outlet manifolds 15 and 16 respectively. Each panel 5 comprises a multi-channel sheet adapted to contain water in channels 4. Five chambers 6 to 10 are formed as shown in FIG. 2 by removing the walls between adjacent channels and then closing the chambers at their extremities by the application of simple pressure and heat to the cut ends to join them one to the other.

French Specification No. 2339830 suffers from the disadvantage that it is not sufficiently robust to meet the requirements of a floor heating system. The heat exchanger of the French Specification No. 2339830 relates to a multi-panel heat exchanger having a pair of spaced headers at one end interconnecting with each panel to provide the fluid inlet and fluid outlet for the heat exchange fluid. In this particular construction, the major difficulty is the jointing of the panels with the inlet and outlet headers.

In this case, the limiting factor is the joint between the headers and not the weld join between the cut ends of the sheet to form the chambers 6 to 10.

The present Applicant has appreciated that by using multi-passage panels in a heat exchange system, then relatively low temperature heating fluids may be employed and this can produce a very much more efficient floor heating system than hitherto available. The Applicant has further appreciated that in order to do this economically it is necessary for him to use multi-channel sheets of the type proposed in French Specification No. 2339830. He has further appreciated that mere simple welding of the end edges of the sheet will not suffice to allow the sheet to withstand the hydraulic shocks and the considerable heat cycling involved over a protracted period of time in its working environment and the present invention seeks to overcome the problems of the prior art by providing a compact heat exchanger suitable for use in an underfloor heating system and yet constructed in such a way as to provide longevity in the working environment.

According to the present invention, there is provided a method for the production of a polymeric heat exchange panel comprising a sheet having a multiplicity of longitudinally extending passages wherein each end is closed to define the manifold space and an inlet or outlet communicating with at least of one of said manifold spaces characterised in that at least one of said manifold spaces is formed by severing longitudinally without substantial removal of material, a plurality of juxtaposed dividing walls towards an end of the sheet and in that opposed sides of the so-cut sheet are plasticised at an elevated temperature and moulded together at their end edges to form a molded end wall having a longitudinal dimension substantially greater than the wall thickness of the sheet.

The end wall so formed preferably has a bulk sufficient to hold the severed end portions apart, thereby allowing circulation of the heat exchange fluid within the manifold space so created. The severed walls may alternatively be separated during molding by means selected from the group consisting of a spider extending laterally across the sheet between the said so-cut ends thereof prior to molding of the end wall and compressed air which is applied within the space during the molding operation. The plastisization and molding may be accompanied by the injection of compatible polymeric material between the severed ends of the sheet which is molded with the plasticised marerial of the cut ends to form said end wall. The material injected between the severed ends may alternatively be obtained by molding the extremity of the plasticised severed ends of the sheet into the end wall itself thereby shortening the longitudinal extent of the cut portion in the final molded product.

The extremities of the severed ends of the sheet may be contacted with a heated jaw until the extremities are fully plastised and the jaws may then be forced together under pressure to mold the plastised material to form said end wall. The severing of the ends of the sheet may be effected by a knife which cuts said adjacent walls without substantial removal of material therefrom. In the alternative, a very fine saw blade may be employed, but it is desirable that as little material as possible should be removed since this is required for molding as far as possible to form said end wall. Where a knife is employed, this is preferably hydraulically driven during the cutting operation.

The inlet and/or outlet may be formed by locating an insert between the severed ends of the sheet and molding the end wall by plastising the extremities of the severed ends and molding the plasticised material to form the end wall and an inlet/outlet nozzle portion about said insert. The insert may be a metal insert which is removed from the nozzle portion after forming. A fillet of a hot melt or a compatible plastics material may be introduced between the severed ends of the sheet for molding of the end wall and said nozzle. In an alternative embodiment of the invention, the nozzle may be a preformed nozzle of the material compatible with the material of said sheet about which the material of said sheet may be molded in accordance with the molding step of the present invention.

The nozzle may be recessed inwardly from said end wall of the manifold portion by molding material juxtaposed said insert thereabout to form the nozzle while simultaneously forming said end wall.

The insert may also be a nozzle preform made of metal with ribs or sealing abutments on one end, which is heated and pressed into the sheet nozzle, whereby the melting plastic encloses the ribs thereby forming a fluid-tight bond. The other end of the insert may be shaped with ribs, barbs or threads, to engage the inner surface of a connecting pipe or tube pushed thereover.

The cut portion of the said sheet which serves to define the manifold, may be cut away towards the base of the nozzle so as to reduce the size of the manifold portion and to leave the nozzle projecting from the sealed end edge of the manifold portion, generally in the plane of the heat exchanger.

In an alternative embodiment, the nozzle may be recessed inwardly from the sealed end of the manifold and the manifold portion cut away and sealed in a recess to allow the nozzle to project therefrom. The nozzle may be provided with an insert for subsequent connection to a conduit or the nozzle may be formed with ribs and adapted to receive a conduit which is subsequently clamped or otherwise sealed thereto to provide fluid tight connection with the heat exchanger.

Where a fillet of material compatible with the multi-channel sheet is employed it may be introduced between the upper and lower end edges for molding therewith, a portion of said fillet may, after the molding step, be left extending longitudinally of the plane of said sheet.

The heat exchanger in accordance with the invention may also include a layer of insulating material.

An insulating layer may be provided on the underside of the heat exchanger and a reinforcing layer provided on the upper surface. The reinforcing material may be a layer of sheet steel or a sheet of asbestos filled concrete such as that commercially available under the trade name ITERNIT produced by Eternit AG of 8867 Niedereernen, Switzerland, which serves to assist heat conductance from the surface of the multi-channel sheet.

In a particular embodiment of the present invention the insulation material is cut away to form a cavity juxtaposed the manifold portion preferably such that the manifold portion may be accommodated at least in part within said cavity in the insulation material. The cavity may serve to accommodate the supply and return conduits for each heat exchanger; the inlet and outlet project into said cavity for connection to the appropriate supply and return conduits.

Where a fillet is used to effect the jointing between the severed upper and lower walls of the sheet, the fillet may project in a plane of the sheet forming a flange and the insulation material may be built up to support an extremity of the flange so that the flange and manifold portions between them serve to bridge a cavity within the insulation material.

A spider or alternatively the use of compressed air during the formation of the manifold portion may be employed to prevent the collapse of the manifold portion during forming and to maintain the manifold portion open during the moulding step to allow in use circulation of liquid within the manifold portion transversely of the sheet. The external edges of the sheets formed by the severence of boundary walls between adjacent conduit portions of the multi-passage sheet may be welded or molded together by injection of a portion of plastified polymer between the open walls and providing heat and pressure to effect the moulding. In this operation, the external edges of the sheet may be plasticised by heat and thereafter a melt may be injected under pressure in between the open walls whereby the end edges are closed with polymer to form a bulked end join.

A multi-passage sheet may be coated with a barrier layer of the material which reduces oxygen diffusion. The barrier layer may be a metal foil, typically either copper or aluminium. In one embodiment of the invention, the layer of metal foil may be of a thickness sufficient to provide load stability to the surface of the multi-passage sheet; the foil weight of at least 1.4 kilogram per square meter being sufficient to provide structural integrity of the surface. Where metal foil is used merely as a oxygen barrier then a thickness of 13 to 30 microns is appropriate.

A multi-passage sheet in accordance with the present invention may be formed of polyethylene, polypropylene, polyvinyl alcohol, ABS copolymer, acrylic polymer or cross-linked polyethylene. The sheet may be in juxtaposition with a supporting element such as board or to like flooring materials to support any weight likely to be imposed from above e.g. by furniture.

In order to reduce oxygen diffusion, polyvinyl alcohol has been found to have a much lower rate of oxygen diffusion, but since one of the advantages of the heat exchanger in accordance with the present invention is that it enables a heating system to employ lower heating fluid temperatures than hitherto, the problems of oxygen diffusion are not so pronounced and the use of polyethylene and polypropylene as the material from which the multi-passage from which the multi-passage sheet is formed entirely suitable in accordance with the present invention.

The invention includes a heat exchanger employing a multi-passage sheet having manifolds in the manner described above, in combination with a lower layer of insulation material on which the sheet is supported and an upper layer of support material which serves to protect the upper surface of the multi-passage sheet and to distribute any load applied thereto. The support material may be a sheet of metal asbestos filled concrete, in which case the carpet or floor covering may be applied direct to the surface of said sheet.

The insulating material may, for example, be polystyrene, the thickness of the insulation material being greater than the overall thickness and size of the manifold portion. In this case, where the body of the panel per se is supported by a layer of insulating material, the manifold portion may extend over the edges of the insulating material and are accommodated in the space juxtaposed an edge thereof. This space being sufficient to accommodate the manifold portion with various feed conduits therefor.

Stakes in the form of pegs and the like of hard wood having a diameter in the order of 10 mm to 20 mm may be set at given distance to each other beneath the heat exchanger and in the insulating layer extending to the floor surface in order to achieve a direct load from the top downward through the insulation to the flooring base. In this case, neither hear exchanger nor insulation need carry any significant load, the supports or pegs may be embedded into the lower side of the heat exchanger where desirable.

The said metal sheet may be mild steel sheet some 1.5 mm thick or panels of asbestos filled concrete some 5 mm thick which overlays the surface of the heat exchanger in contact with the peg or supports to constitute a protective surface. The panels themselves may be laid side by side across the floor with a manifold portion subsrantially aligned, the inlet or outlet of each panel being either both on one side of the array of panels or on opposite ends of alternate panels. In a further embodiment of the present invention the inlet may be provided at one end of each panel of the array and the outlet at the other. The panels may be connected in series or in parallel with the heat source by means for example of a double cavity conduit, one cavity being for the supply and one for the return. The covering metal plate may be provided with separate access plates in order to obtain ready access to the pipe work and connections for the assembly.

The heat exchanger may be in the form of strong aluminium/polyester film shaped in an envelope or quilt as generally self-supporting stress free element defining a multiplicity of channels for the circulation of heat exchanger fluid. In a floor heating system incorporating a multi-passage sheet in acordance with the invention, since such a sheet has a large plane surface area over which heat transfer to the space to be heated may occur; this means that the temperature difference between the space to be heated and the temperature of the heating fluid can be significantly reduced. With such a light weight system, which responds quickly to temperature change because this temperature difference is relatively small, it is practicable to employ with the present invention heat pumps and solar heating energy sources where heretofore because of the small effective heating area the temperature differential using such sources was too small.

Following is a description by way of example only and with reference to the accompanying drawings of methods of carrying the invention into effect.

In the drawings:

FIG. 4 illustrates a typical embodiment of a heat exchanger in accordance with the present invention.

FIG. 5 is a cross section through FIG. 4.

FIG. 6 is a perspective view of a cut multi-channel sheet in accordance with the invention.

FIG. 7 is a perspective view of FIG. 6 showing the location of the insert.

FIG. 8 is a perspective view of FIG. 7 showing the formation of the recessed nozzle portion.

Figure 1:
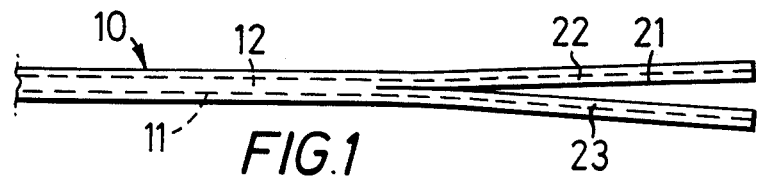
FIG. 1 is a side view of a multi-channel sheet accordance with the present invention showing the longitudinal cut therein.
Figure 2:
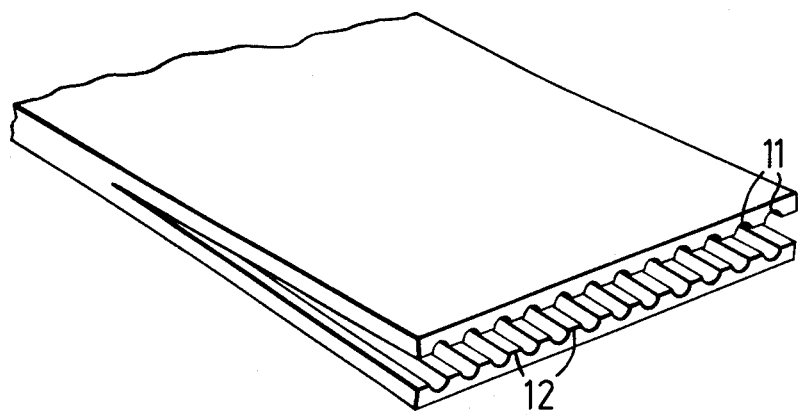
FIG. 2 is a perspective view of FIG. 1.
Figure 3:
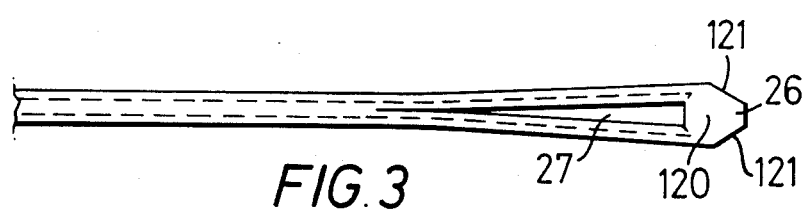
FIG. 3 is a section of the sheet of FIG. 1 showing the end wall.

Turning first to the heat exchanger illustrated in FIGS. 1 to 5, a multi-passage sheet 10 has a plurality of longitudinal conduits 11 extending from one end to the other. Each conduit 11 is separated from the adjacent conduit by means of a partition wall 12. The multi-passage sheet 10 carries above it a sheet 13 of mild steel having a thickness of 1.5 mm. The sheet 10 is provided at a first end with a manifold portion 30 which is formed by severing the longitudinal walls 12 between adjacent conduits to provide a longitudinally extending cut 21 extending inwardly of the sheet approximately 40 to 50 mm. The cutting operation is effected by means of a very fine circular saw or by a hydraulically driven knife so as to avoid removal of substantial quantities of material and the cut ends appear very much as shown in FIG. 2. The cut ends are plasticised by contacting the extremities of each cut end 22, 23 with a heated jaw and the heating is continued until the extremity of each cut end portion juxtaposed the heating jaw is fully plasticised. At this stage the jaws are then forced together under pressure and the extremity of the plasticized portion is then folded longitudinally inwards under pressure and the jaws clamped tight to complete a molding operation to form a solid massive end wall 26 as shown in FIG. 3.

The cut ends are plasticized by heating and optionally a layer of thermoplastics material may be injected between the ends, and the whole moulded to form a bulked end join. The thermoplastics material may be injection-moulded between the edges of the severed upper and lower walls and the upper and lower walls are clamped together with the injected material moulded therebetween under the influence of the heat and pressure to seal the edges by a bulked end join or wall 26 which separates the opposed sides of the cut sheet to form a transverse manifold space 27 extending from one side of the sheet to the other. The manifold 30 is provided with an inlet and an outlet (not shown) and a central partition to separate one side of the manifold from another whereby one manifold provides the inlet manifold portion and the other, the outlet, both disposed at one end of a multi-passage sheet. Where the manifold is divided to provide both inlet and outlet of one end then the depth of severence of the side walls 12 may be increased towards the centre to allow a sufficient flow of fluid from the passages on one side of the sheet to the passages on the other.

The sheer 10 is supported on a layer of insulating material 18, such as polystyrene, provided with a plurality of load bearing stakes at spaced intervals for abutting the solid floor 20 and extending upwardly to the underside surface 16 of the multi-passage sheet 10.

In the embodiment shown in FIGS. 4 and 5 the load-bearing support may be by means of a stake 25 which is supported on floor surface 20 and extends upwardly through the layer of insulating material 18 and extends into the body of multi-passage sheet 10 to collapse the same over a localised area and to terminate in juxtaposition to the underside of mild steel sheet 13 to provide direct support between the cover sheet 13 and the floor surface 20.

Turning now to FIGS. 6 to 10, a multi-passage sheet 110 has a plurality of longitudinal conduits extending from one end to the other. Each conduit is separated from adjacent conduits by means of a partition wall. Towards an end 111 of sheet 110, the partition walls are removed, for example by cutting, in the plane of the sheet 110 to provide a transverse cut 112 extending across the sheet. The longitudinal edges 113 of the sheet are left with their edgewise partition walls intact to provide a continuous longitudinal edge to close the ends of a manifold defined by the cut or severed portion 112. (This is not shown in FIG. 6 which has been cut away to show the nature of the manifold portion of the heat exchanger panel 110). The severed portion, therefore, has a plurality of striations 114 extending substantially longitudinally of sheet 110 on each inner surface of the cut away portion 112, said striations 114 being the remains of the severed wall portions which, prior to severance, define the longitudinal conduits or passages within sheet 110.

In the formation of an inlet or outlet for a manifold to be formed at the end of the sheet 110, a metal insert 116 is inserted to extend within cut away portion 112, the insert having a diameter to be substantially compatible with the spacing of striations 114 on the internal surfaces of the cut away portions 112. The insert is maintained in position as shown by 117 in FIG. 7 for subsequent withdrawal on completion of the molding of the nozzle. A mould clamp or plate heated to a temperature of the order of 210° C. is then applied to either side of sheet 110, and is maintained there to preheat and plasticise the cut sheet ends 112. A typical dwell period for the preheating is 15 secs, the period being selected according to the material of the sheet to plasticise the same, i.e. to raise the temperature of the cut sheet ends 112 towards the melting point thereof. The plasticised ends are then subjected to both heat and pressure, to melt the material juxtaposed insert 117 to provide a sealed recess 118 (see FIG. 7) having an upstanding cylindrical nozzle 119 formed around insert 117. The heat and pressure forms a fillet 120 which extends longitudinally inwardly from end edge 111 of sheet 110 and is provided on the outer surface with chamfered surfaces 121. The longitudinal sealed portions are united at their lower end by a transverse sealed portion 122 extending therebetween. The nozzle 119 is upstanding from chamfered lower surfaces 122 and is provided with a hollow passage 123 which communicates with the manifold portion 124, the extremity of which is defined by the innermost extremity of the cut away portion 125 (see FIGS. 5 to 9).

Figure 9:
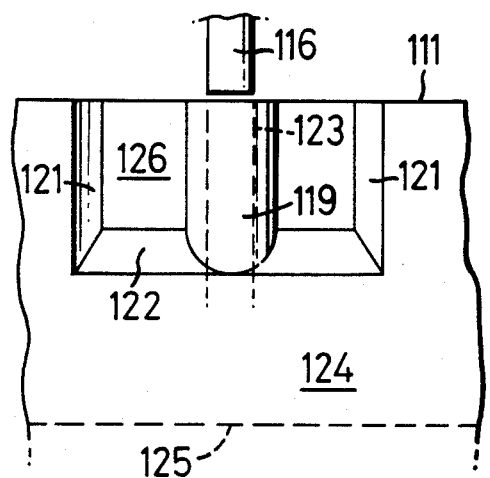
FIG. 9 is a side view of FIG. 8.

The flashing 126 between the nozzle 119 and the longitudinal sealing filler 121 may then be cut away or removed (see FIG. 9). The outer surface of nozzle 119 may be finished to provide a uniform cylindrical form together with any ribs or sealing abutments desirable thereon. The open edge 111 may be sealed across the remaining end edge to enclose the manifold so that the bore 123 of nozzle 119 provides a communication with the manifold portion thus formed.

Figure 10:
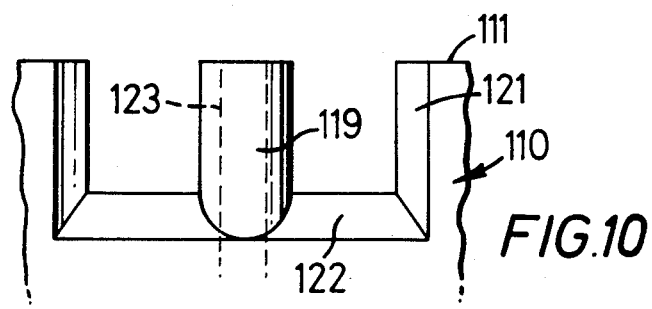
FIG. 10 is a side view of FIG. 9 showing the flashings removed and the finished nozzle in a recessed configuration.
Figure 11:
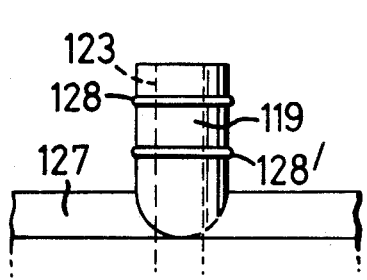
FIG. 11 is an alternative arrangement derived from FIG. 10.

In the example shown in FIG. 11, the manifold portion has been further cut away to provide a sealed end edge 127 from which the nozzle 119 projects as shown in FIG. 10, the nozzle 119 is provided with a pair of peripheral ribs 128, 128' which serve to assist jointing of the inlet/outlet nozzle 119 with a conduit in fluid tight connection therewith.

Figure 12:
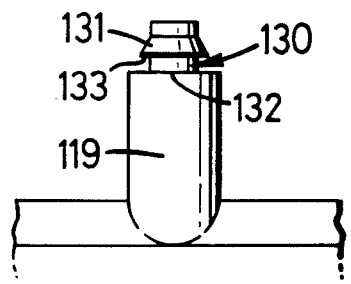
FIG. 12 is a further embodiment showing the provision of a nozzle insert.

FIG. 12 shows another embodiment in which an insert is a preformed insert which is substituted for metal insert 116 in the method described above. Alternatively, the insert 130 may be inserted within a nozzle 119 after formation of the nozzle 119 by the above method and sealed therewith either by means of a glue or by the further application of heat or pressure or both. The nozzle may have an annular barb 131 and may be adapted to receive over said barb portion, a conduit for connection therewith which can be clamped by means of a band or like clamping device located between the outer extremity 132 of nozzle 119 and the rearward extremity 133 of barb 131. The insert 116/117 may be applied by means of a withdrawable insert fixed to a moulding machine in which the mould forming the nozzle portion as depicted in FIGS. 8 and 9 may form part of a clamp mould whereby the application of heat and pressure serve to amalgamate material from the area on either side of the insert to form the cylindrical nozzle and to seal end fillet portions 121 and 122 in the recessed portion about the insert. Alternatively, the machine may be adapted to inject a proportion of a mouldable material compatible with the material forming the sheet 110 where this may be deemed appropriate.

Figure 13:
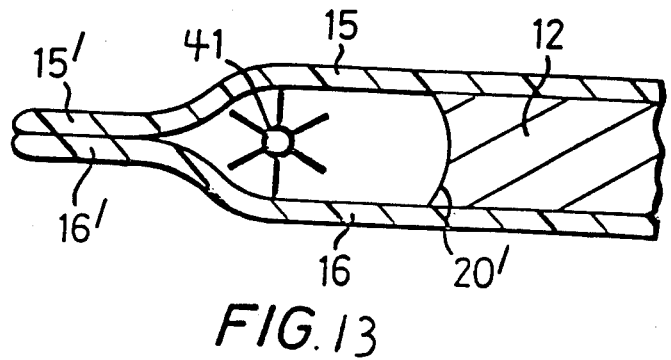
FIG. 13 is a sectional view of an alternative manifold construction in accordance with the present invention.

FIG. 13 illustrates an embodiment wherein sidewalls 12 are cut away to provide upper sheet wall portion 15 and lower sheet wall portion 18. After the manifold space has been formed by severing longitudinally the plurality of juxtaposed dividing walls toward an end of sheet 10 to form severed opposed sides thereof, the severed opposed sides are separated during molding by spider 41.

Figure 14:
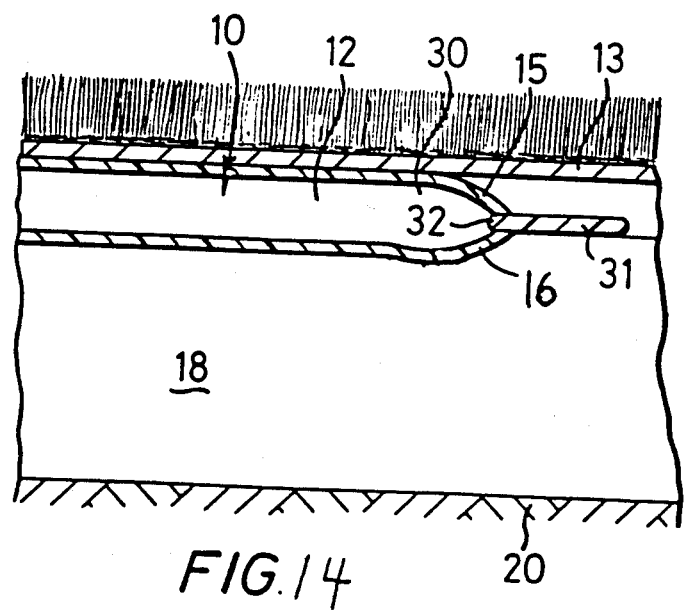
FIG. 14 is a longitudinal section through a typical heat exchange in accordance with the present invention.

In the FIG. 14 embodiment, sheet 10 has an upper surface 15, a lower surface wall 16 and a plurality of dividing walls 12 which serve to divide the internal body of sheet 10 into a plurality of longitudinally extending passages or conduits. After dividing walls 12 have been severed longitudinally to form severed opposed sides thereof, a portion is provided between upper surface wall 15 and lower surface wall 16 which is unconnected by walls, thereby defining manifold portion 30, extending transversely of the sheet. A fillet piece 31 is introduced between the severed opposed sides of sheet 10 for molding of the end wall, as well as an insert located between the severed opposed sides of the sheet.

The embodiments described above constitute a facile means of providing a heating or cooling surface having a large effective heating or cooling surface as a proportion of the whole area available for a floor, wall or ceiling heating system. The use of the multi-passage sheet provides stability and support for a floor on the one hand and yet a substantial heated area on the other. The thickness of the structure is sufficiently small that the floor system in accordance with the invention can be employed in existing buildings; the ambient temperature of the heating fluid ambient temperature of the heating fluid employed need only be of the order of 30° C. to provide an adequate heating system. It is, therefore, practical to employ with the present invention heat pumps and solar energy heating where heretofore the temperature differential was too small to be really effective.

The total thickness including structural members for a unit to be used on an existing floor need not exceed 20 cm and usually need not exceed 4 or 6 cm with the result that there is no requirement for door furniture, light switches and the like to be moved, whereas with a similar system using polyethylene pipes and the concrete overlay the overall thickness of greater than 10 to 40 cm results in a need for substantial alterations to incorporate such a system in an existing room.

I claim:

1. A method for the production of a polymeric heat exchange panel comprising a sheet having a multiplicity of longitudinally extruding passages and a plurality of juxtaposed dividing walls respectively disposed between adjacent said passages, wherein each end of said passages is closed to define a manifold space, and at least one of an inlet and an outlet communicating with at least one of said manifold spaces, said method comprising forming at least one of said manifold spaces by severing longitudinally without substantial removal of dividing wall material said plurality of juxtaposed dividing walls towards an end of the sheet to form severed opposed sides thereof, plasticizing said severed opposed sides of said sheet at an elevated temperature and molding said opposed sides together at end edges thereof to form a molded end wall having a longitudinal dimension substantially greater than a thickness of a wall of said sheet, wherein the severed opposed sides are separated during molding by means selected from the group consisting of a spider and compressed air.

2. A method as claimed in claim 1 wherein the end wall so formed has a bulk sufficient to hold the severed opposed sides apart.

3. A method for the production of a polymeric heat exchange panel comprising a sheet having a multiplicity of longitudinally extruding passages and a plurality of juxtaposed dividing walls respectively disposed between adjacent said passages, wherein each end of said passages is closed to define a manifold space, and at least one of an inlet and an outlet communicating with at least one of said manifold spaces, said method comprising forming at least one of said manifold spaces by severing longitudinally without substantial removal of dividing wall material said plurality of juxtaposed dividing walls towards an end of the sheet to form severed opposed sides thereof, plasticizing said severed opposed sides of said sheet at an elevated temperature and molding said opposed sides together at end edges thereof to form a molded end wall having a longitudinal dimension substantially greater than a thickness of a wall of said sheet, wherein said plasticizing and molding are accompanied by injection of a compatible polymeric material between the severed opposed sides of the sheet, which is molded with said plasticized portion of the severed opposed sides to form said end wall.

4. A method as claimed in claim 3 wherein the material injected between the severed opposed sides is obtained by molding an extremity of the plasticized severed opposed sides of the sheet.

5. A method as claimed in claim 3, wherein the end wall so formed has a bulk sufficient to hold the severed opposed sides apart.

6. The method as claimed in claim 5, wherein the material injected between the severed opposed sides is obtained by molding an extremity of the plasticized severed opposed sides of the sheet.

7. A method for the production of a polymeric heat exchange panel comprising a sheet having a multiplicity of longitudinally extruding passages and a plurality of juxtaposed dividing walls respectively disposed between adjacent said passages, wherein each end of said passages is closed to define a manifold space, and at least one of an inlet and an outlet communicating with at least one of said manifold spaces, said method comprising forming at least one of said manifold spaces by severing longitudinally without substantial removal of dividing wall material said plurality of juxtaposed dividing walls towards an end of the sheet to form severed opposed sides thereof, plasticizing said severed opposed sides of said sheet at an elevated temperature and molding said opposed sides together at end edges thereof to form a molded end wall having a longitudinal dimension substantially greater than a thickness of a wall of said sheet, wherein extremities of the severed opposed sides of the sheet are each contacted with one of a set of heated jaws until said extremities are fully plasticized to form a plasticized material and the jaws are then forced together under pressure to mold the plasticized material to form said end wall.

8. The method as claimed in claim 7, wherein the end wall so formed has a bulk sufficient to hold the severed opposed sides apart.

9. A method for the production of a polymeric heat exchange panel comprising a sheet having a multiplicity of longitudinally extruding passages and a plurality of juxtaposed dividing walls respectively disposed between adjacent said passages, wherein each end of said passages is closed to define a manifold space, and at least one of an inlet and an outlet communicating with at least one of said manifold spaces, said method comprising forming at least one of said manifold spaces by severing longitudinally without substantial removal of dividing wall material said plurality of juxtaposed dividing walls towards an end of the sheet to form severed opposed sides thereof, plasticizing said severed opposed sides of said sheet at an elevated temperature and molding said opposed sides together at end edges thereof to form a molded end wall having a longitudinal dimension substantially greater than a thickness of a wall of said sheet, wherein said at least one of said inlet and said outlet is formed by locating an insert between the severed opposed sides of the sheet and molding the end wall by plasticizing extremities of the severed opposed sides to form a plasticized material and molding the plasticized material to form the end wall and an inlet/- outlet nozzle portion about said insert, and wherein one of a fillet and a hot melt of a compatible plastics material is introduced between the severed opposed sides of the sheet for molding of the end wall and said nozzle.

10. The method as claimed in claim 9, wherein the end wall so formed has a bulk sufficient to hold the severed opposed sides apart.

11. The method as claimed in claim 9, wherein the end wall so formed has a bulk sufficient to hold the severed opposed sides apart and wherein said plasticizing and molding are accompanied by injection of a compatible polymeric material between the severed opposed sides of the sheet, which is molded with said plasticized portion of the severed opposed sides to form said end wall.

12. The method as claimed in claim 11, wherein the nozzle insert is preformed from a polymeric material compatible with a material of said sheet.

13. The method as claimed in claim 9, wherein the end wall so formed has a bulk sufficient to hold the severed opposed sides apart and wherein extremities of the severed opposed sides of the sheet are each contacted with one of a set of heated jaws until said extremities are fully plasticized to form a plasticized material, and the jaws are then forced together under pressure to mold the plasticized material to form said end wall.

14. The method as claimed in claim 13, wherein the nozzle insert is preformed from a polymeric material compatible with a material of said sheet.

15. A method for the production of a polymeric heat exchange panel comprising a sheet having a multiplicity of longitudinally extruding passages and a plurality of juxtaposed dividing walls respectively disposed between adjacent said passages, wherein each end of said passages is closed to define a manifold space, and at least one of an inlet and an outlet communicating with at least one of said manifold spaces, said method comprising forming at least one of said manifold spaces by severing longitudinally without substantial removal of dividing wall material said plurality of juxtaposed dividing walls towards an end of the sheet to form severed opposed sides thereof, plasticizing said severed opposed sides of said sheet at an elevated temperature and molding said opposed sides together at end edges thereof to form a molded end wall having a longitudinal dimension substantially greater than a thickness of a wall of said sheet, wherein said at least one of said inlet and said outlet is formed by locating an insert between the severed opposed sides of the sheet and molding the end wall by plasticizing extremities of the severed opposed sides to form a plasticized material and molding the plasticized material to form the end wall and an inlet/outlet nozzle portion about said insert, and wherein the nozzle insert is preformed from a polymeric material compatible with a material of said sheet.

16. The method as claimed in claim 15, wherein the end wall so formed has a bulk sufficient to hold the severed opposed sides apart.

* * * * *